(12) United States Patent
Young et al.

(10) Patent No.: US 6,898,599 B2
(45) Date of Patent: May 24, 2005

(54) METHOD AND SYSTEM FOR AUTOMATED WEB REPORTS

(75) Inventors: William J. Young, Golden, CO (US); Janice L. Platt, Littleton, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 523 days.

(21) Appl. No.: 10/039,362

(22) Filed: Oct. 26, 2001

(65) Prior Publication Data

US 2003/0084062 A1 May 1, 2003

(51) Int. Cl.[7] .............................................. G06F 17/30
(52) U.S. Cl. ....................................................... 707/10
(58) Field of Search .............................. 707/1–10, 102, 707/101; 709/200, 202, 203, 221; 705/32; 714/1

(56) References Cited

U.S. PATENT DOCUMENTS

| | | | | |
|---|---|---|---|---|
| 6,286,030 B1 | * | 9/2001 | Wenig et al. | 709/203 |
| 6,611,839 B1 | * | 8/2003 | Nwabueze | 707/101 |
| 6,643,635 B2 | * | 11/2003 | Nwabueze | 707/2 |
| 6,687,733 B2 | * | 2/2004 | Manukyan | 709/200 |

* cited by examiner

Primary Examiner—Diane D. Mizrahi
(74) Attorney, Agent, or Firm—Lahive & Cockfield, LLP

(57) ABSTRACT

The present invention provides a method and system for viewing reports on a network. One embodiment of the present invention employs a temporary database for holding data to be used in the reports, where the data extracted from a source database. A format module formats the reports using the data in the temporary database, and an access module allows users to access the reports created by the format module.

31 Claims, 5 Drawing Sheets

METHOD AND SYSTEM FOR AUTOMATED WEB REPORTS

FIELD OF THE INVENTION

The present invention relates generally to software and more particularly to a software facility for formatting web-based reports based on the activities of a database without requiring direct access to the database.

BACKGROUND OF THE INVENTION

The Common Gateway Interface (CGI) is a standard for interfacing external applications with servers, such as web servers or HTTP servers. With CGI, a developer can write scripts that create interactive, user-driven applications. CGI enables a Web server to invoke an external program and pass user-specific data to the program. The program processes the data and generates a response. The server passes the program's response back to a client. CGI enables Web pages to be created dynamically, based upon the input of users rather than statically. CGI scripts have been used to interface databases with remote clients.

Another commonly employed technology for interfacing databases with remote clients is "servlets". A servlet is akin to an applet that runs on a server. A servlet is an object that extends the functionality provided by a server. A servlet provides a component-based platform-independent method for building web-based applications, without the performance limitations of CGI programs.

Unfortunately, using CGI and/or servlets to generate reports from a database requires direct database access. As such, these technologies put a load on the associated database when a report is requested. The load can be substantial when multiple parties request the reports and can detract from other database management activities. Moreover, direct database access raises a number of security issues.

SUMMARY OF THE INVENTION

The present invention addresses the above-described limitations of conventional systems by providing a software facility for formatting web based reports based on the activities of a database without requiring direct access to the database. This approach provides an uncomplicated way to maintain data consistency and maintain sufficient system security.

According to one aspect of the present invention, in an electronic device coupled to a network a method is provided for generating reports. The method includes the step of creating a temporary database for holding information from a source database. The method also includes the step of loading the temporary database with data originating from the original database. The method also comprises the step of using the temporary database to generate a report regarding the source database. The method further comprises providing the report for access over the network.

According to another aspect of the present invention, a medium for use in an electronic device coupled to a network is provided. The medium holds instructions for performing a method. The method includes the step of creating a temporary database for holding information from a source database. The method also includes the step of loading the temporary database with data originating from the original database. The method also comprises the step of using the temporary database to generate a report regarding the source database. The method further comprises providing the report for access over the network.

According to another aspect of the present invention, a system for viewing reports in a network is provided. The system comprises a temporary database for holding data to be used in the reports. The data is extracted from a source database. The system includes a format module for formatting the reports using the data in the temporary database. The system further includes an access module for allowing access by users in the network to the reports created by the format module.

According to another aspect of the present invention, a method for viewing reports in a network is provided. The method comprises the step of defining tables and views to be used in the reports. The method includes the step of updating data received from a different database in the network into tables and views of the temporary database. The method further comprises the step of formatting the reports by using the data received into the tables and views of the temporary database. The method further includes the step of allowing access by users in the network to the reports created by the format module.

BRIEF DESCRIPTION OF THE DRAWINGS

The aforementioned features and advantages, and other features and aspects of the present invention, will become understood with regard to the following description and accompanying drawings; wherein.

DETAILED DESCRIPTION

The illustrative embodiment of the present invention provides a tool that provides database reports that are viewable over a network without requiring direct database access. The illustrative embodiment creates temporary database tables and views in memory. Data is inserted into the temporary tables and views and the data is then extracted from the tables and views, as needed, to generate reports. Lastly, the temporary tables and views are removed from memory.

Figure 1:
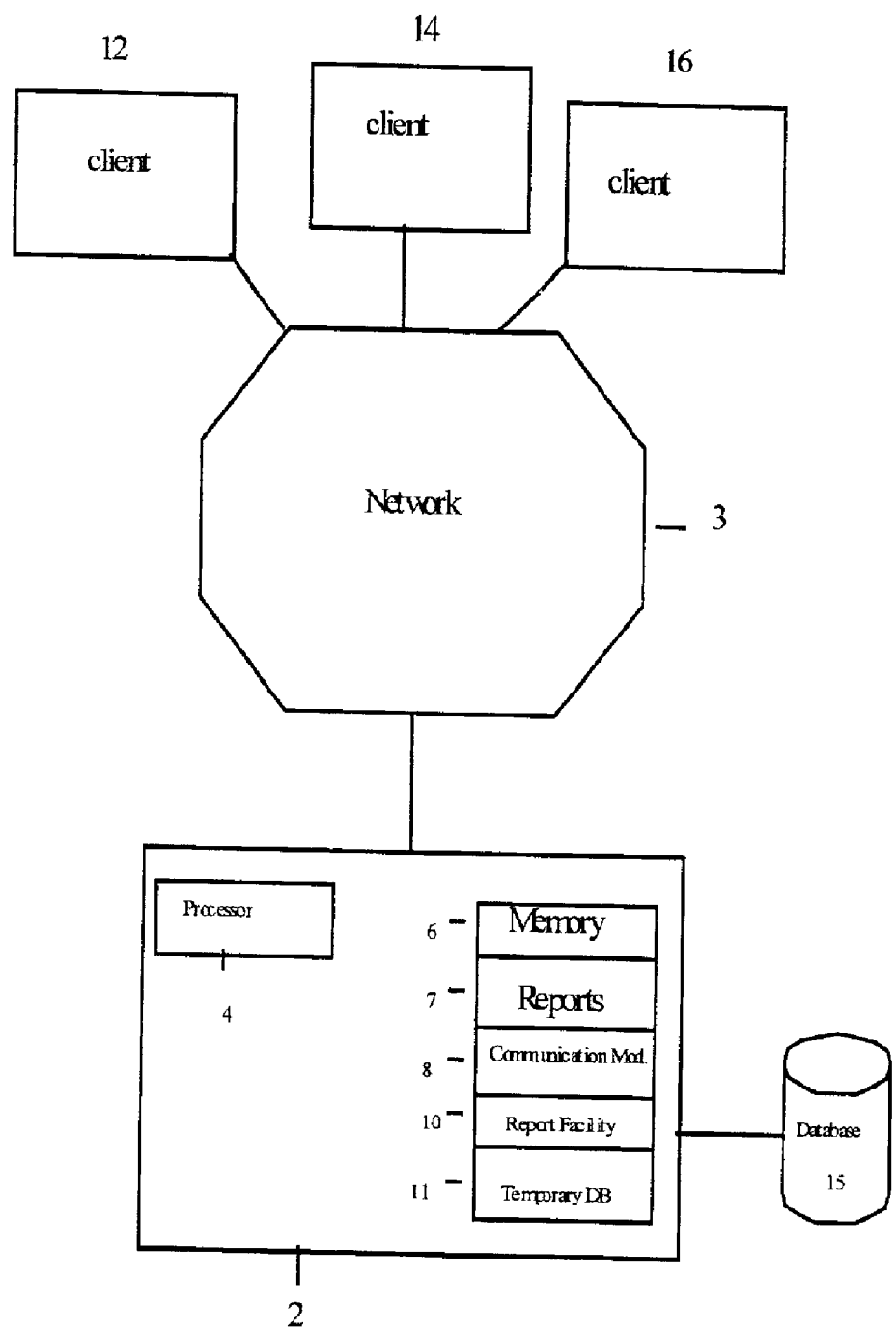
FIG. 1 illustrates a distributed environment suitable for practicing an illustrative embodiment of the present invention.

FIG. 1 illustrates a distributed environment suitable for practicing the illustrative embodiment of the present invention. The distributed environment includes a server that may be accessed by clients 12, 14, and 16. The server 2 may be implemented on a dedicated device or on a device shared by other processes. Suitable devices for the server 2 include but are not limited to a workstation or a server computer system. In the illustrative embodiment, it is presumed for illustrative purposes that the server 2 uses the HTTP protocol to communicate with the clients 12, 14, and 16. The clients 12, 14, and 16 may be any of a number of types of electronic devices, including but not limited to personal computers, workstations, personal digital assistants (PDAs), intelligent pagers, mobile phones, electronic books or Internet appliances. A network 3 interconnects the server 2 with the clients 12, 14 and 16. The network 3 may take many forms including the Internet, an intranet, an extranet, a wireless network or a communication network (such as a telephone network).

The server 2 includes a processor 4 for executing programs. The server 2 includes a memory 6 for storing documents and programs, such as applets. The memory 6 holds a communication module 8 for facilitating communications with clients 12, 14, and 16. The communications may include requests for database reports 7 or web pages, for example. The server 2 has a report facility 10 that is responsible for creating and managing database reports without direct database access. As will be described in more detail below, the report facility may create a temporary database 11 in memory 8 to create database reports 7 as needed. The temporary database 11 is built from data in a database 15.

The illustrative embodiment generates highly customizable documents, such as web formatted reports. The illustrative embodiment does not require putting high loads on database 15 at the time the report is requested. Also, the illustrative embodiment provides modules which aid in creating formatted reports without direct access to the database 15. The information in the temporary database 11 is utilized to generate or regenerate web-based reports. In particular, the illustrative embodiment creates a temporary database 11 into which information from database 15 is downloaded. The downloaded information is used to generate reports 7. The illustrative embodiment does not allow direct access to the database 15 to generate reports 7. The temporary database 11 acts as a buffer for the database 15.

Figure 2:
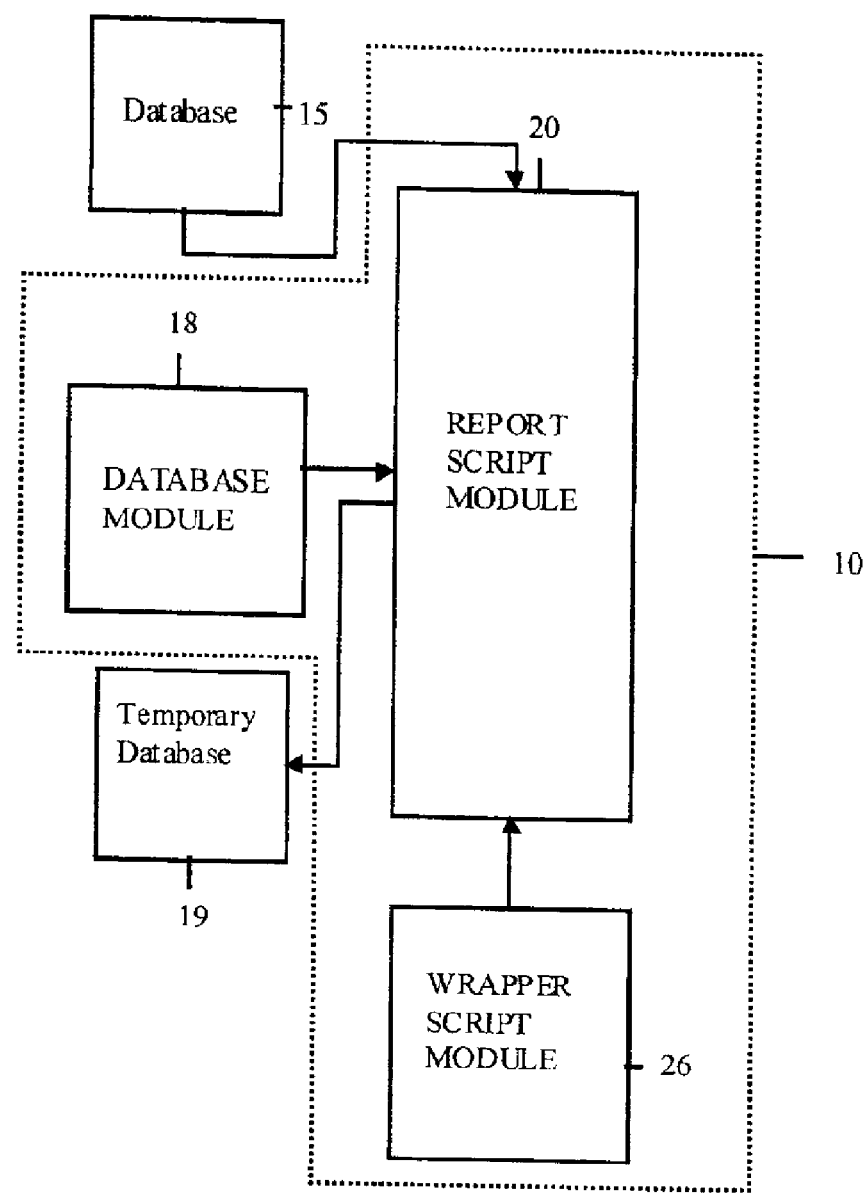
FIG. 2 illustrates interaction among software modules in the illustrative embodiment of the present invention.

The report facility 10 provides the necessary tools to automatically generate reports. The report facility 10 includes software modules 18, 20, and 26 (FIG. 2). The interaction among the software modules 18, 20, and 26 of the report facility 10 generate the reports by utilizing the stored information in temporary database 19. In particular, the database module 18 includes defined tables and views of a pre-selected reporting format. The database module 18 includes all the necessary information to define the tables and views needed to create a particular report. In particular, the database module 18 provides the reporting script with the needed information to define the various tables and views for a selected report. Essentially, the database module 18 is a repository for information regarding the various report formats utilized by the illustrative embodiment.

Report script module 20 manages the task of updating the reports. The report script modules receives a notification from the wrapper script module 26 to start generating reports. The report script module 20 utilizes information in the database module 15 to create temporary database 11. The report script module 20 uses the information in the database module to create temporary database 11. The report script module 20 also downloads information from database 15 into temporary database 11. The temporary database 11 maintain a replicated copy of the information in database 15. The report script module 20 removes all information that relates to previous reports to eliminate any inconsistent information from previously generated reports. The report script module 20 downloads the information from the database 15 into the temporary database 11. The database 15 is not further consulted and separated from the processing of the reports. Thus, users of the reports do not directly access database 15. The report script module 20 enables displaying the reports to clients that employ a web browser. The report script module 20 includes various output display formats for the reports that may be used with the illustrative embodiment. The reports may be generated in a number of formats including, but not limited to HTML, XML, PDF, word processing format or spreadsheet format.

The wrapper script module 26 manages the timing assigned for the generation of reports. The wrapper script module 26 uses the system clock of the server 2 for managing the time associated with generating reports. Once the wrapper script module 26 determines a time has arrived to generate a report, the wrapper script module 26 sends notification to the report script module 20 to generate or regenerate the report. The wrapper script module 26 notifies the report script module 20 to generate reports at a time where the load on the server will not impact the users. The wrapper script module 20 maintains information regarding the non-peak times of the server 2 so that the reports may be generated at optimal times. The non-peak times information may be provided by the system administrator or stored in a database where the written script module 26 may access the information. The information may include a list of times where the server 2 usage is low. The wrapper script module 26 also measures at each non-peak time the current usage of the server 2. The resulting usage information is compared against a threshold value. The threshold value defines a minimal usage value which is required to generate the reports without causing interruption to server 2. For example, if the server 2 is performing a set of operations which require extensive computing resources at a non-peak time period, then the wrapper script module 26 will not execute the report script module 20 to generate the reports. Otherwise, if the operations do not require extensive computing resources, then the wrapper script module 26 will notify the report script module 20 to generate the reports. The illustrative embodiment essentially minimizes the interference that is associated with the generation of reports.

Figure 3:
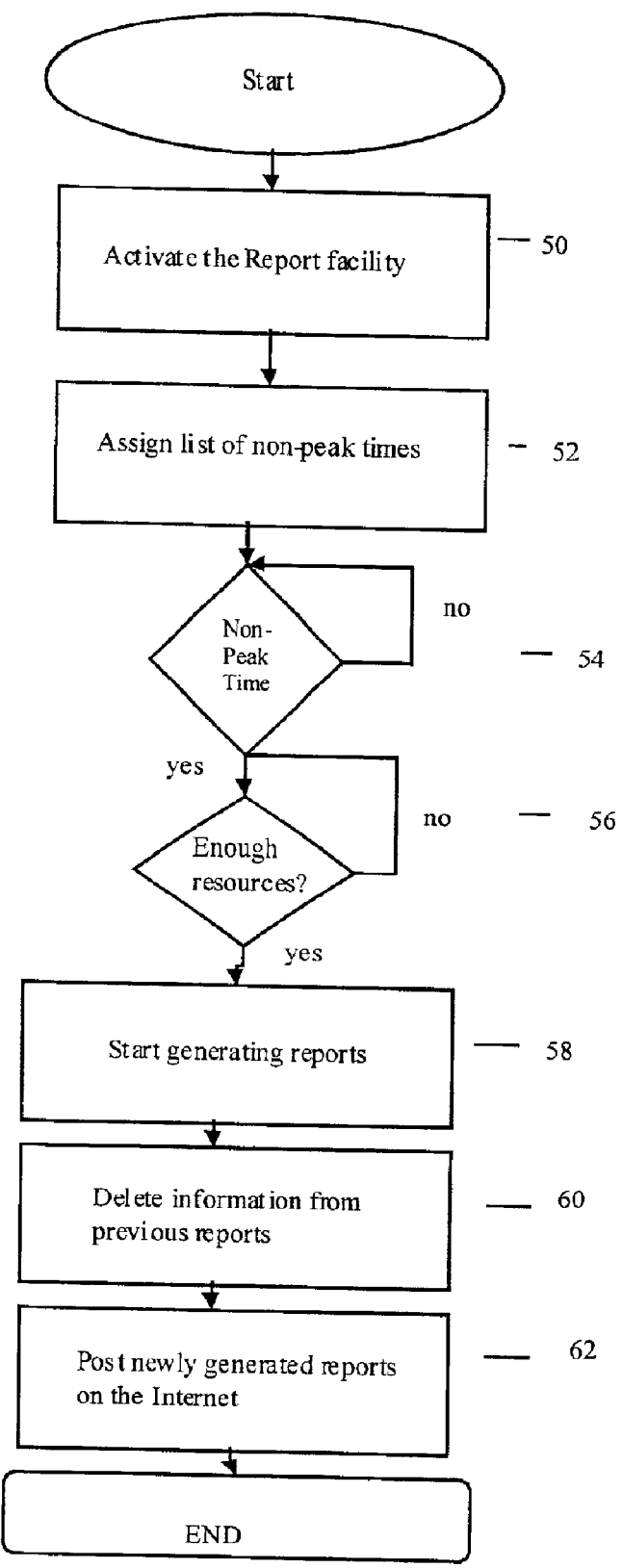
FIG. 3 depicts a flowchart illustrating steps performed by the report facility to generate reports.

FIG. 3 depicts a flowchart illustrating steps performed by the report facility 10. The system administrator activates the report facility 10 by running a script (step 50). A list of non-peak times is provided to the report facility 10 by either the system administrator or a database (step 52). The report facility 10 monitors the available computing resources of the server 2 at the specified non-peak times (i.e., is the server too busy?) (step 54). Thus, at every non-peak time the report facility 10 determines whether the server 2 has enough capacity to generate reports (step 56). Once the report facility 10 determines there is enough capacity, the report facility 10 starts generating the requested reports (step 58). The report facility 10 deletes information from previous generated reports (step 60). This prevents any potential conflicts among data between the newly generated reports and previously generated reports. The report facility 10 posts the newly generated reports on the Internet to be viewed by users (step 62).

Figure 4:
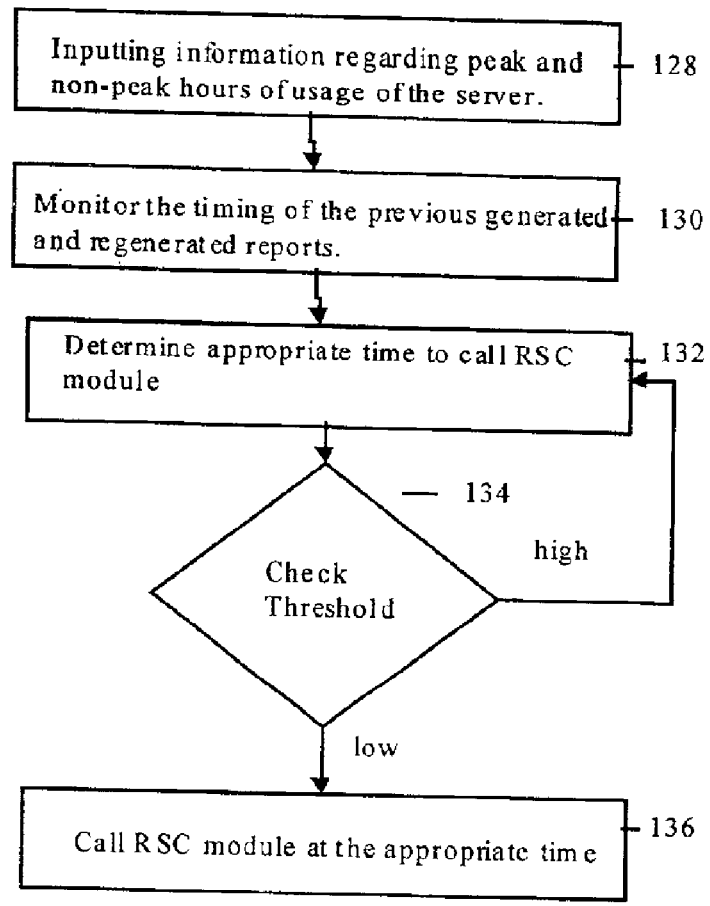
FIG. 4 depicts a flowchart illustrating steps performed by the wrapper script module.

FIG. 4 illustrates a detailed description of the wrapper script module 26. As discussed above, the wrapper script module 26 manages the timing assigned for the generation and regeneration of reports. A system administrator or system manager will input to the wrapper script module 26, through a pop-up window or the like, the various peak and non-peak hours of the server 2 (step 128). This allows the wrapper script module 26 to determine the various times to generate or regenerate reports. As discussed above, the wrapper script module 26 generates or regenerates reports when the server usage is low. Report generation is done without lowering the performance of the server 2. The wrapper script module 26 monitors for the non-peak time periods usage is low to determine whether it would be safe to start generating reports (step 130). The wrapper script module 26 monitors timing by checking the inputted non-peak times. The wrapper script module 26 determines the time to generate or regenerate reports by the actual usage of the server 2 (step 132). The wrapper script module 26 at every non-peak time checks the actual server usage. The server 2 stores the actual server usage. The wrapper script module 26 checks to see if the actual server usage is at a certain threshold (step 134). If the threshold is high, then the wrapper script module 26 checks for the next available non-peak time for report generation. Otherwise, the wrapper script module 26 notifies the report script module 20 to start generating or regenerating reports (step 136).

Figure 5:
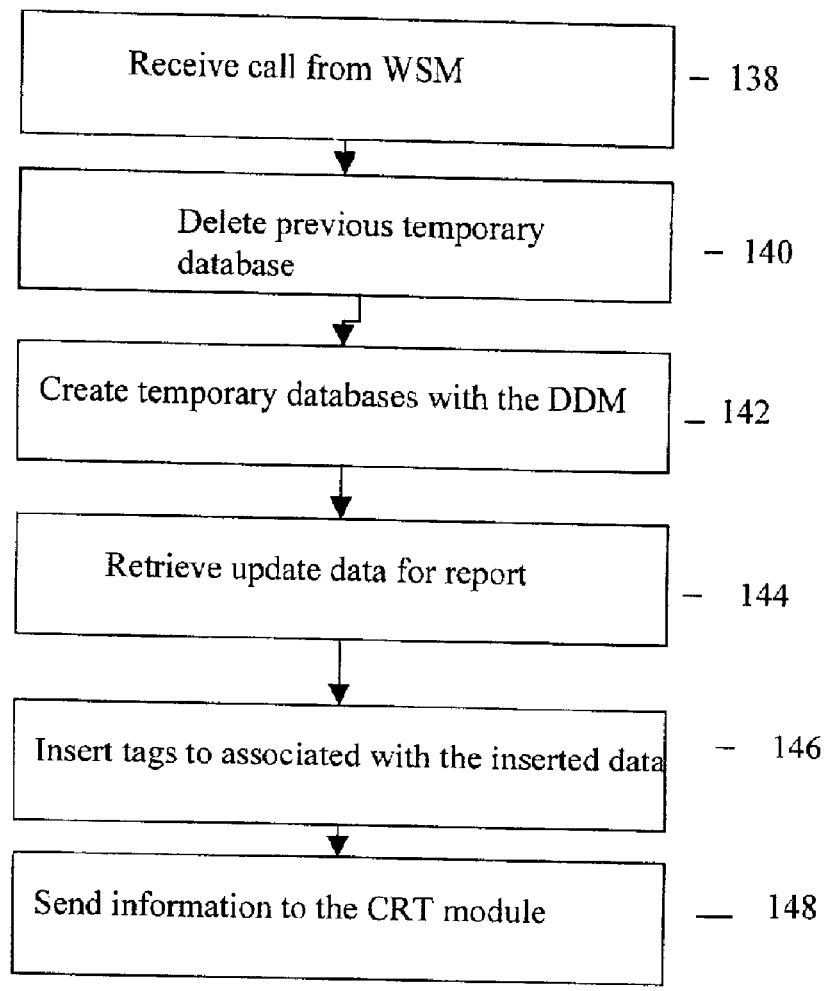
FIG. 5 depicts a flowchart illustrating steps performed by the report script module.

FIG. 5 depicts a flowchart illustrating steps performed by the report script module 20. As discussed above, the report script module 20 generates or regenerates the requested reports. The report script module 20 receives a request from the wrapper script module 26 to commence the report generation (step 138). As discussed above, wrapper script module 26 determines the period time when report generation is to occur. The wrapper script module 26 notifies the report script module 20 by way of a signal. Once the report script module 20 receives the signal from the wrapper script module 26, the report script module proceeds to start report generation. Also, the illustrative embodiment presumes that the database 15 has been updated prior to the wrapper script module 26 notifying the report script module 20. The report script module 20 proceeds to delete the contents of the temporary database 11 from a previous report generation (step 140). The illustrative embodiment presumes that the temporary database 11 may have content from a previous report generation, however, the illustrative embodiment is not limited to that presumption. The report script module 20 can create a temporary database 11 if there has not been any generated reports prior to the wrapper script module 26 notifying the report script module by using the information database creation information in the database module 18. After the report script module 20 deletes the contents in the temporary database 11, the report script module 20 creates the format for the temporary database by retrieving database formatting information, such as table and views, from the database module 18 (step 142). As discussed above, the database module 18 may include several tables and views for various web-based report formats. The temporary database 11 contains the same formatting (tables and views) structure as database 15. After creating the temporary database 11, the report script module 20 proceeds to upload the information contained in the database 15 into the temporary database (step 144). For a while, the information in the temporary database 11 is similar to the information in the database 15. The temporary database 11 acts as a buffer between the database 15 and users of the web generated reports. The users of the web-based reports never directly access the contents of database 15. Thus, eliminating the possibility of corrupting the information in database 15. All information regarding the generation of the web-based reports are accessed directly from the temporary database 11. After the report script module 26 downloads information into the temporary database 11, the report script module 20 assigns tags specific to the generated reports (step 146). The assignment of the tags is to identify the types of reports generated. Afterwards, the report script module 20 processes the information in temporary database 11 to be displayed (step 148).

Numerous modifications and alternative embodiments of the invention will be apparent to those skilled in the art in view of the foregoing description. Accordingly, this description is illustrative only and is for the purpose of teaching those skilled in the art the best mode for carrying out the invention. Details of the structure may vary substantially without departing from the spirit of the invention, and exclusive use of all modifications that come within the scope of the appended claims is reserved. It is intended that the invention be limited only to the extent required by the appended claims and the applicable rules of law.

Having described the invention, what is claimed as new and protected by Letters Patent is:

1. In an electronic device coupled to a network, a method, comprising the steps of:
   creating a temporary database for holding information from a source database;
   loading the temporary database with data originating from the source database;
   determining that a current usage of an electronic device holding the source database does not exceed a parameter;
   using the temporary database to generate a report regarding the source database;
   providing the report for access over the network.

2. The method of claim 1, wherein the network is the Internet.

3. The method of claim 1, wherein the report is one of an HTML document and XML document.

4. The method of claim 1 further comprising the steps of:
   removing data from the temporary database after the report is generated; and
   updating the temporary database with data from the source database prior to generating a new report.

5. The method of claim 1 further comprising the step of:
   removing the temporary database from the electronic device after the report is generated.

6. The method of claim 1 further comprising the step of:
   generating additional reports regarding the source database by using the temporary database.

7. The method of claim 1 further comprising the step of:
   identifying a non-peak load time on an electronic device holding the source database.

8. The method of claim 7, wherein the non-peak load time is provided by a system administrator.

9. The method of claim 7, wherein an identification of the non-peak load time is retrieved from a pre-determined location.

10. The method of claim 7, wherein the generation of reports regarding the source database takes place during the identified non-peak load time.

11. A medium for use in an electronic device coupled to a network, said medium holding instructions for performing a method, comprising the steps of:
   creating a temporary database for holding information from a source database;
   loading the temporary database with data originating from the source database;
   determining that a current usage of an electronic device holding the source database does not exceed a parameter;
   using the temporary database to generate a report regarding the source database;
   providing the report for access over the network.

12. The medium of claim 11, wherein the method further comprises the steps of:
   removing data from the temporary database after the report is generated; and
   updating the temporary database with data from the source database prior to generating a new report.

13. The medium of claim 11, wherein the method further comprises the step of removing the temporary database from the electronic device after the report is generated.

14. The medium of claim 11, wherein the method further comprises the step of generating additional reports regarding the source database by using the temporary database.

15. The medium of claim 11 further comprising the step of:

identifying a non-peak load time on an electronic device holding the source database.

16. The medium of claim 15, wherein the non-peak load time is provided by a system administrator.

17. The medium of claim 15, wherein an identification of the non-peak time is retrieved from a pre-determined location.

18. The medium of claim 15, wherein the generation of reports regarding the source database takes place during the identified non-peak load time.

19. A system for viewing reports in a network, said system comprising;

a temporary database holding data to be used in the reports, said data being extracted from a source database;

a format module for formatting the reports using the data in the temporary database; and an access module for allowing access to users in the network the reports created by the format module; said access module allowing generation of said reports following a determination that a current usage of an electronic device holding the source database does not exceed a parameter.

20. The system of claim 19, wherein the access module provides the reports in a format that is viewable by a client using a web browser.

21. The system of claim 19 further comprising:

an interface for interfacing the system with the network.

22. The system of claim 21, wherein the network is the Internet.

23. The said system of claim 19, wherein the determination of a current usage occurs at an identified non-peak load time on an electronic device holding the source database.

24. The system of claim 23, wherein the access module receives the identified non-peak load time via one of a system administrator and a value retrieved from a pre-determined location.

25. A method for viewing reports in a network, said method comprising:

creating a temporary database for holding information from a source database;

loading the temporary database with data originating from the source database;

defining tables and views to be used in the reports;

updating the temporary database with data received from a different source database in the network;

using the temporary database to generate a report regarding at least one of the source databases;

allowing access to users in the network to the generated reports created by a format module; and removing old reports after a specified amount of time from the temporary database.

26. The method as recited in claim 25, wherein the reports are web accessible reports.

27. The method of claim 25, wherein the network is the Internet.

28. The method of claim 25 further comprising the step of:

identifying a non-peak load time on an electronic device interfaced with said temporary database.

29. The method of claim 28, wherein the non-peak load time is provided by a system administrator.

30. The method of claim 28, wherein the non-peak load time is identified by retrieving a value from a pre-determined location.

31. The method of claim 25 further comprising the step of:

determining current usage of an electronic device holding said source database does not exceed a pre-determined parameter.

* * * * *